United States Patent Office 3,689,475
Patented Sept. 5, 1972

3,689,475
SYNTHESIZED MUTANT RNA AND METHODS OF PREPARING SAME
Solomon Spiegelman and Reuben Levisohn, Champaign, Ill., assignors to University of Illinois Foundation, Urbana, Ill.
Filed July 18, 1969, Ser. No. 842,868
Int. Cl. C07d 51/50
U.S. Cl. 260—211.5 R                         14 Claims

ABSTRACT OF THE DISCLOSURE

Biologically active mutant variants of ribonucleic acids (RNA) which can replicate faster than the ribonucleic acid from which they were derived or descended can be replicated in vitro in an enzymatic synthesizing system. The mutant variants may be derived directly from the original or the parent ribonucleic acid, or derived from another mutant variant which in turn can be derived from the original or parent ribonucleic acid. If desired, such mutant variants can be synthesized and recovered from an in vitro enzymatic synthesizing system which may include a selected agent which is effective intending to combat (inhibit the growth of or destroy) the original or parent or descendants of the original or parent ribonucleic acid. In such case, the isolated mutant variants are resistant to the presence of the agent in the selected system.

---

A United States Government contract or grant from or by the Public Health Service supported at least some of the work set forth herein.

This invention relates to methods and systems useful in the synthesis in vitro of ribonucleic acid mutant variants (also referred to simply as mutants or variants). The isolated mutant variants may be derived or descended directly from an original or parent ribonucleic acid, or may be derived or descended directly from mutant variants which in turn were derived or descended either directly from other mutant variants of the original or parent ribonucieic acid or from the original or parent ribonucieic acid itself.

More specifically, this invention relates to methods and enzymatic synthesizing systems useful for the synthesis in vitro and under selected conditions of mutant variants designed to compete successfully with the original or parent ribonucleic acid, or intermediate descendants thereof, in the presence of selected agents which can combat (inhibit the further synthesis or replication or destroy) the original or parent ribonucleic acid, or intermediate descendants thereof, so as to be inhibitory-resistant. This invention also relates to the resulting isolated mutant variants which are capable of replicating faster than the ribonucleic acid from which they were derived or descended.

The isolation of ribonucleic acid mutant variants replicating in an enzyme synthesizing system and resistant to anti-viral agents, can be accomplished by performing the selection of the mutant variants in the presence of the anti-viral agents.

Work constituting a basis for the invention suggests that precellular evolution could have involved selective forces of previously unsuspected diversity and subtlety.

Further, the invention provides an opportunity for studying the genetics and evolution of a self-duplicating nucleic acid molecule under conditions permitting detailed control of environmental parameters and chemical components.

Still further, the invention opens a novel pathway toward the use of specific means for interfering with viral replication.

Before discussing the invention, a background of related discoveries shall first be described herein.

As used herein, the term "biologically active" includes material that possesses genetically competent characteristics or information essential to life or processes thereof. These biologically active materials are genetically competent and can transmit information to a system that will follow their instructions and translate them into biological sense. Ribonucleic acids, including mutants or variants thereof, which have the capability of being replicated are thus deemed to be biologically active regardless of whether or not they are capable of yielding or producing complete virus particles. Thus, ribonucleic acids, regardless of molecular weight, structural configuration, or base sequence, which can be replicated, are deemed to be biologically active.

The term "intact," as used herein, includes biologically active normal or mutant or variant ribonucleic acids which have or retain recognition structure which can be recognized by its replicase.

Living organisms, including humans, animals, plants, and microorganisms, use biologically active nucleic acids in the processes of storing and transmitting translatable genetic or hereditary information or messages and in the synthesis of the large number of tissue and body proteins. Two nucleic acids which can function under proper conditions as transmitters of the genetic code are DNA (deoxyribonucleic acid) and RNA (ribonucleic acid). In the living organism, these nucleic acids are generally combined with proteins to form nucleo-proteins.

These DNA and RNA molecules consist of comparatively simple constituent nucleotides (nitrogen base, pentose sugar moiety, and phosphate groups) polymerized into chains containing hundreds to thousands of these nucleotide units generally linked together through chemical bonds formed between the constituent phosphate and sugar groups.

These nitrogen bases are classified as purines or pyrimidines. The pentose sugar is either ribose or deoxyribose. Phosphoric acid groups are common to both DNA and RNA. On complete hydrolysis, DNA and RNA yield the following compounds:

| DNA | RNA |
|---|---|
| Adenine (A) | Adenine (A) |
| Cytosine (C) | Cytosine (C) |
| Guanine (G) | Guanine (G) |
| Thymine (T) | Uracil (U) |
| Methylcytosine | |
| Hydroxymethylcytosine | |
| Deoxyribose | Ribose |
| Phosphoric acid | Phosphoric acid |

It should be noted that the bases adenine (A), cytosine (C), and guanine (G) are common to both DNA and RNA; the base thymine (T) of DNA is completely replaced by the base uracil (U) in RNA. Methylcytosine occurs in small amounts in various deoxyribonucleic acids of animal origin and in wheat germ. In the DNA of several bacteriophages, cytosine is completely replaced by hydroxymethylcytosine.

Hydrolysis of these nucleic acids under appropriate conditions liberates a group of compounds known as nucleotides; these nucleotides consist of a purine or pyrimidine base linked to a pentose sugar moiety, which sugar moiety is esterified with phosphoric acid. These nucleotides are the subunits from which polymeric nucleic acids are constructed.

The ribonucleic acid polynucleotide structure may be represented diagrammatically, for example as follows:

The dotted lines above represent ester groupings between one of the free hydroxyl groups of the pentose and of the phosphate groups. The subscript $n$ represents the number of repeating units which constitute the particular ribonucleic acid molecule.

Chemists have shown that the DNA molecule has a doubly-stranded chain which, when shown in three dimensions, has two chains intertwined in a double helix. Each chain consists of alternating nucleotides, there being ten nucleotides in each chain per rotation of the helix, this ten nucleotide chain being about 34 A. in length. Both chains are right handed helices. These helices are evidently held together by hydrogen bonds formed between the hydrogen, nitrogen and oxygen atoms in the respective chains. The structure of the DNA molecule as it relates to the sequence of these bases in the molecule is now being elucidated; these structural studies are important, since it is now generally believed that this sequence of bases is the code by means of which the DNA molecule conveys or transmits its genetic information.

Chemists have shown that RNA generally is a single-stranded structure that has in its backbone the 5-carbon sugar ribose instead of the 5-carbon deoxyribose sugar found in DNA. As in DNA, the different nucleotides are linked together through the phosphate groups to form a long chain and thus to form an RNA molecule of high molecular weight. The RNA molecules do not seem to be as highly polymerized as the DNA molecules, and although there is evidence of hydrogen bonding between the RNA bases in some viruses (e.g., reovirus), it is thought that no helical structure is involved. As with DNA, base sequence studies are now being made with RNA, for the sequence of bases in the RNA is the code by which the RNA molecule conveys or transmits its genetic information.

In genes, the repository of hereditary factors of living cells and viruses, specific genetic information resides in the nucleotide sequence appearing in the DNA and RNA molecules. These sequences are transmitted, encoded, and reproduced in vivo by the complex enzymic systems present in living organisms. If no modification of the genetic DNA or RNA takes place, an exact duplicate or replicate of the nucleotide sequence is produced; this newly formed RNA or DNA in turn results in the production in vivo of an exact duplicate or replicate of a particular protein molecule. If, however, a change takes place in the DNA or RNA molecules, which change can be mediated by some mechanism such as radiation, a foreign chemical reactant, etc., a "mutation" takes place wherein the altered DNA or RNA molecules duplicate or replicate the "new" DNA or RNA and these in turn produce new or altered proteins as dictated by the altered nucleotide structure.

Referring now to various U.S. patents related to the subject matter hereof, U.S. Pat. 3,444,041 to Spiegelman and Haruna relates to methods for synthesizing (replicating) in vitro biologically active, intact ribonucleic acids (RNA or mutant RNA), such as viral RNA, with an enzymatic system containing a biologically active, intact, homologous ribonucleic acid template, a purified enzyme catalyst known as "replicase" which is a specific RNA-dependent RNA-polymerase for the particular ribonucleic acid to be replicated, and requisite ribonucleotide base components (riboside triphosphates) which combine in the system to produce exact replicas of the template, and the recovery of such synthesized, biologically active ribonucleic acids. That patent (as does U.S. Pats. 3,444,024-4) shows the presence of divalent ions as a cofactor (magnesium ions) in the system. That patent also relates to the purified replicase for viral RNA which is suitable for use in the system.

U.S. Pat. 3,444,041 shows that the new, synthesized RNA is a self-propagating and biologically competent entity which directs its own synthesis.

The replicase used in the system of that patent was rigorously purified to remove detectable destructive contaminants or degrading enzymes, including ribonuclease I and phosphorylase, was freed of impurities or materials with which it is found in nature, and showed a mandatory, discriminatory requirement for the homologous template and recognized the RNA of its origin.

The specific replicase for a particular viral RNA can be obtained either by introducing a selected virus nucleic acid (e.g., bacteriophage), freed of any existing protective proteinaceous coat, into an uninfected host bacterium cell to synthesize an enzyme which is thought not to pre-exist in the host cell, or, preferably, by introducing an intact bacteriophage (virus particle) into the bacterium cell to synthesize this enzyme. The purified replicase enzyme is obtained from this system.

The particular intact, viral RNA used as initiating template in an illustrative system used in U.S. Patent 3,444,041 was isolated from purified virus. It was obtained by deproteinizing the RNA with phenol and purifying the RNA on sucrose gradients. It was not obtained from the virus-infected bacteria, but from the complete virus particle.

The nucleotide bases or substrate components for viral RNA replication should have sufficiently high bond energy for replication. Satisfactory replication of viral RNA has been achieved with four riboside triphosphates, namely, adenosine triphosphate (ATP), guanosine triphosphate (GTP), cytidine triphosphate (CTP), and uridine triphosphate (UTP).

With the enzymatic, self-duplicating system, one may synthesize or replicate, for example, a ribonucleic acid molecule (RNA) identical with the intact template continuously over extended or prolonged periods until or unless on arbitrarily or selectively stops the synthesis. In this self-replication, the nucleotides are assembled structurally in the identical sequence that characterizes the template.

An RNA template of an in vitro replicating system may be formed in situ. If one were, for example, to introdduce foreign bases or nucleotides (e.g., analogues of known bases or nucleotides) into the replicating system, a mutant may be formed which would be the biologically active template for replication with those same bases or nucleotides. In such a system, one would be synthesizing mutant RNA in a controlled manner.

The RNA product that is synthesized may be selectively isotopically labeled and may be in the form that is free of detectable impurities or other materials with which it is otherwise found in Nature. Synthesized viral RNA, for example, is free of its normally occurring protein coating.

The purified replicase showed a mandatory requirement for added RNA, which acts as the template, and exhibited a unique discriminatory preference for its homologous, intact RNA (RNA of its original). The inability of the purified replicase to provide for the copying of fragments of RNA template indicates that the replicase can sense the difference between an intact and fragmented template, which fragmented template is not recognized by the replicase.

The ability of the replicase to discriminate solves a crucial problem for an RNA virus attempting to direct its own duplication in an environment replete with other RNA molecules. By producing a polymerase which ignores the mass of pre-existent cellular RNA, a guarantee is provided that replication is focused on the single strand of incoming viral RNA, the ultimate origin of progeny.

U.S. Patent 3,444,042 to Spiegelman and Haruna relates to purified replicases which are substantially free of viral infectivity, as well as destructive contaminants which were removed in forming the less purified replicase used in Patent 3,444,041, and the use of such a replicase freed of virus particles for synthesizing in vitro biologically active, intact ribonucleic acids (RNA or mutant RNA), such as viral RNA, in enzymatic systems such as shown and covered by Patent 3,444,041. The purified replicase is able to recognize the intact RNA of its origin, and the RNA directs its own synthesis in the system and is the instructive agent in the replication process.

The purified, replicase, such as covered by this patent, is substantially free of detectable levels of virus particles and infectious RNA, and the infectious RNA produced with the enzymatic system and method are intact and are free of impurities or materials with which they are otherwise found in Nature. The synthesized viral RNA, for example, is free of the normally occurring protein coating present in the intact viral particle. The synthesized RNA may be directly assayed for biological activity.

The purified replicase may be obtained from cells infected with an RNA virus, for example, by a process involving the steps of lysis, DNAase digestion, fractionation, absorption and elution by column chromatography, banding to equilibrium in density gradients, and zonal centrifugation in linear viscosity and density gradients.

The enzymatic systems of U.S. Patent 3,444,042, as well as U.S. Patent 3,444,041, provide means for studying the evoltuion of a self-duplication nucleic acid molecule outside of a living cell (i.e., in vitro). (It has been noted that the system mimics at least one aspect of the earliest precellular evolutionary events when environmental selection operated directly on the genetic material.)

The controlled RNA product produced with the enzymatic systems and methods of U.S. Patents 3,444,041-2 offers the advantage of being useful in experimental, laboratory and commercial activities where one wishes to use a biologically active RNA that is effectively free or free of detectable compounding or extraneous materials. The controlled enzymatic systems of U.S. Patents 3,444,041-2 also are effectively free or free of detectable confounding or extraneous materials and thus provide an important means for studying the mechanism by which genetic changes and replication occur in life's processes and a means of understanding, modifying, or changing such processes or mechanisms.

On a practical basis, the availability of the purified replicases of U.S. Patents 3,444,041-2 allow one to move into research areas and areas of investigation not previously accessible. Thus, one can now proceed to determine such things as the effect of small or large changes in the replicase molecule upon its ability to synthesize RNA, and to determine the change in the biological activity of the RNA so produced by the altered replicase.

The discovery of methods to produce purified, replicases (RNA-dependent RNA-polymerases), including replicases substantially free of detectable levels of viral infectivity and other biologically inactive contaminants such as shown in U.S. Patent 3,444,042, should be useful in the study and/or preparation of products with anti-viral activity, anti-cancer activity, and hormone and/or enzyme activity. Research directed toward the preparation and evaluation of such products could lead to important therapeutic advancements.

It is known that disease-causing viruses commonly include RNA molecules; for example, the viruses which cause tobacco and tomato mosaic disease, poliomyelitis, influenza, Newcastle disease in poultry, mumps, and certain cancer disease such as myeloma in mice and myeloblastosis in poultry, among others, or ribonucleic acid (RNA) viruses. U.S. Patents 3,444,041-2 point to the possibility that replicases for such RNA viruses could be derived from an appropriate system. The isolation in vitro of such replicases in purified form provides means for the study of the biochemistry of the diseases.

Referring to U.S. Patent 3,444,043 to Spiegelman, that patent relates to methods of selectively interfering with the specific replicase of a homologous, biologically active, intact ribonucleic acid (RNA), such as viral ribonucleic acid, by the use of an inhibiting compound which neutralizes or interferes with the recognition mechanism between the replicase and the ribonucleic acid. Further, it relates to the replicase united with the inhibiting compound. Still further, it relates to methods of selectively interfering with replication by the in vitro replicating systems of U.S. Patents 3,444,041-2 by injecting an inhibiting compound into the replicating system.

This selective interference involves interacting (e.g., by some mechanism such as hydrogen bonding, charge-to-charge interaction, or the like) the inhibiting compound and the replicase, although it should be understood that such interaction is not intended to exclude the possiblity that there may be some interaction between the viral RNA and interfering compound.

The work set forth in U.S. Patent 3,444,043, among other things, opens up a new approach to achieve highly selective interference with viral multiplication. Further, one can envision an applicable chemotherapeutic procedure for combatting diseases in animals, wherein the inhibiting compound is administered to animals in a form such that it can enter the cells, and destroying enzymes usually present in the cells cannot negate its activity.

Referring now to U.S. Patent 3,444,044 to Spiegelman, that patent relates to methods and systems useful in the synthesis or replication in vitro of biologically active mutants of ribonucleic acids (mutant RNA), including non-competent, abbreviated ribonucleic acids not heretofore available for laboratory or commercial use.

U.S. Patent 3,444,044 also points out that the biologically active ribonucleic acid that is the template for the synthesis in vitro of replicas of the template is the instructive agent for this synthesis and is a self-duplicating entity. (This has been shown by the fact that when the replicase was provided alternatively with two distinguishable biologically active RNA molecules, the product produced was always identical to the initiating template and was a self-duplicating entity. The RNA thus directs its own synthesis and there is no "activation" of pre-existing RNA. The replicase is a passive follower of such instructions, and it is the input RNA which is replicated and not some cryptic contaminant of the replicase). In demonstrating this, for example, mutants were used for test purposes because the discriminating selectivity of the replicase for its own genome ("genome" refers to the entire complement of genes in a cell, and the genes provide a repository of genetic information for living cells and viruses) as a template made it impossible to employ heterologous RNA.

As described in U.S. Patent 3,444,044, a system can be provided in which the biologically active, intact, mutant RNA was progressively encouraged to retain its recognition mechanism, but to throw away or discard genetic material (sections of its sequences) which is no longer needed in the in vitro replicating system.

More specifically, U.S. Patent 3,444,044 points out that biologically active mutant RNA can be synthesized in vitro with the catalytic aid of the specific purified replicase for the intact, viral RNA from which the mutant is derived, so that the size of the mutant decreases, and, correspondingly, its rate of replication increases. The abbreviated mutant is biologically active as evidenced by its ability to replicate or produce replicas; however, it is defective or non-competent in that it cannot yield complete virus particles.

The synthesized, biologically active, non-infectious, intact, RNA mutant that is recovered has the unique ability to compete much more actively for the catalytic services of the specific replicase enzyme and to replicate faster, as compared with its larger siblings and the biologically active, intact, viral RNA from which the mutant is derived. This increased rate of replication enables the smaller, biologically active, intact, mutant RNA, which may be an innocuous mutant which has no capacity to complete the viral life cycle, to provide selective means for interfering with viral replication by tying-up and out-competing for the services of the replicase.

Every replication system inherently can make a mistake and produce mutations, and the conditions of replication can be controlled so that chance of such mistakes occurring can be suppressed or encourgaed. In the event the biologically active, intact, homologous RNA is altered so that the recognition site of the resulting mutant is retained intact but its secondary structure is modified or discarded so the replicase can scan the mutant faster and identify its recognition sequence faster, then the biologically active, intact, mutant RNA and its descendants can serve as templates which can replicate faster than the RNA from which they are derived.

The intact, homologous, viral RNA molecule normally has a number of functions to perform in order to effect its replication. It has to carry information for a coat protein; it has to provide information for its specific replicase, including recognition by the replcase; and it has to provide information for at least one other enzyme protein, possibly two. These particular needs, however, are not necessary in the particular in vitro replicating system referred to in U.S. Patent 3,444,044 because the system was provided with a replicase and everything that was needed for synthesis, and the mutant could afford to throw away all sections of those genetic materials necessary to perform such functions. In an illustrative system referred to in that patent such information and related functions were no longer needed; the complete virus partcile was not going to be synthesized.

The work disclosed in the U.S. Patent 3,444,044 generates an opportunity for studying the genetics and evolution of a self-replicating RNA molecule in a simple and chemically controllable medium. Of particular interest is the fact that such work can be carried out under conditions in which the only demand made on the molecules is that they multiply; they can be liberated from all secondary requirements (e.g., coding for coat protein, etc.) which serve only the needs and purposes of the complete organims.

U.S. Patent 3,444,044 considered, for example, the question of what are the evolutionary consequences if the only demand made on the RNA molecules is that they multiply? To answer these and related issues, a serial transfer experiment has been performed in which the intervals of synthesis were adjusted to select the earliest molecules completed. More specifically, the RNA molecules were encouraged to throw away unnecessary genetic materials by conducting a serial transfer experiment in which the intervals of synthesis were adjusted to select the earliest molecules completed, and by limiting the amount of triphosphate substrates present in the reaction mixture. As the experiment progressed, the rate of synthesis of mutants increased and the synthesized mutant became smaller but was still biologically active. That is, the time required to finish the first molecules was carefully calibrated, and samples of synthesized material were removed shortly before this calibrated time had elapsed, and this fast transfer procedure was followed for each serial transfer. The selective pressure is then in the direction of selecting for the fastest synthesizing mutant. As the experiment progressed, the rate of mutant synthesis increased and the molecules of mutants synthesized became smaller. By the 74th transfer, the replicating molecule eliminated about 83% of its original genome to become the smallest self-duplicating biologically active entity.

The work reflected by U.S. Patent 3,444,044 provides insight into a number of central issues. The patent, for example, points out that the smallest self-duplicating entity known can be constructed by the above-described means and provides means for analyzing the replicative process. Further, the patent states that sequences involved in the recognition mechanism between the template and replicase enzyme must be retained, leading to the enrichment of the smaller molecules which evolve. Finally, the abbreviated RNA molecules referred to were no longer able to direct the synthesis of complete virus particles; this feature opened up a novel pathway toward highly specific means for interfering with viral RNA replication.

Proof that purified $Q\beta$-replicase (Haruna and Spiegelman, Proc. Natl. Acad. Sci., U.S. 54, 579 (1965)) catalyzes the synthesis of both normal and mutant (Pace and Spiegelman, Science, 153, 64 (1966)) infectious $Q\beta$-RNA established that the RNA is the instructive agent in the replicative process. The fact that the RNA molecule satisfies the operational definition of a self-duplicating entity generated the possibility of performing extracellular Darwinian experiments.

The first step in exploiting the inherent potentialities of this system was a serial transfer experiment (Example 1 below) which resulted in the selection of variant V-1 (75th variant). In the serial transfers which led to the isolation of V-1, the product of each reaction was diluted 12.5-fold in the course of being used as a template for the next tube. To maintain the selective pressure, the period of incubation was shortened at intervals. This mutant replicated some 15 times faster than $Q\beta$-RNA and retained 550 of the 3600 residues originally present in the parental molecules.

It was shown (Levisohn and Spiegelman, Proc. Natl. Acad. Sci., U.S., 60, 866 (1968)) that purified $Q\beta$-replicase can be initiated to synthesize copies by a single molecule of template. The resulting clone of descendants provided a population of individuals possessing the kind of uniformity required for sequence studies of variant molecular structures and made possible the inception of in vitro genetics of replicating molecules. In performing these experiments, a new variant, V-2, was isolated. To isolate the new fast-growing mutant, V-2, a modification was introduced in the selection procedure; the incubation interval at 38° C. was held constant for 15 minutes and increasing selective pressure was achieved by recurrent sharp increases in the dilution experienced by successive transfers. Variant-2 replicated faster than V-1. Thus, measurable RNA synthesis occurred in a 15-minute reaction when initiated with as little as 0.29 $\mu\mu\mu g$. of V-2; however, more than 300 times as much is required with V-1. This phenotypic difference was maintained over many transfers.

The approach used in the Levisohn and Spiegelman paper referred to above depended on a straightforward comparison of the observed frequency distribution with that expected from Poisson statistics in a series of repeated syntheses. Thus, if one strand is sufficient to start a synthesis, then the proportion of tubes showing no synthesis should correspond to $e^{-m}$, $m$ being the average number of strands inoculated per tube. Further, if the onset and syntheses were adequately synchronized, one might hope to identify tubes that received one, two, or three strands; these should appear with frequencies corresponding to $me^{-m}$, $(m^2/2!)e^{-m}$, and $(m^3/3!)e^{-m}$, respectively.

It is evident that the work reported in that paper made rather severe demands on the purity of the replicase preparation employed. It must be sufficiently free of contaminating nucleases so that there is a high probability that a single strand will initiate and complete its replication. Further, the content of contaminating RNA must be low enough so that tubes that receive no added template molecule will not show evidence of synthesis in the time period of the experiment. It should be noted that as little as 1 $\mu\mu$g. of residual RNA in 10 $\mu$g. of enzyme (i.e., 1 in $10^7$ contamination by weight) would correspond to the presence of $1.2 \times 10^7$ strands. This difficulty can be obviated with the use of a variant Q$\beta$-RNA that grows much faster than the ordinary Q$\beta$-RNA molecules expected as contaminants; this procedure was followed in the experiments described in the previously mentioned Levisohn and Spiegelman paper.

The previous work involving mutants thus far described was concerned with the isolation of mutants possessing increased growth rates under standard conditions. Attention was turned then to a question of no little theoretical and practical interest and inquire whether other mutant types can be isolated. In effect the following question was asked: Can qualitatively distinguishable phenotypes be exhibited by a nucleic acid molecule under conditions in which its information is replicated but never translated? The results set forth herein show that numerous differentiable variants can be isolated, the number depending on the ingenuity expended in designing the appropriate selective conditions.

The work described herein demonstrates that it is possible to isolate in vitro a variety of mutant RNA molecules which exhibit qualitatively distinguishable phenotypes. The results suggest that precellular evolution could have involved selective forces of previously unsuspected diversity and subtlety.

Suitable adjustment of the selective conditions of the enzymatic synthesizing system leads to the isolation of variants optimally designed to compete successfully with the original viral nucleic acid. One of the properties that can be built into the variants is resistance to the presence of a variety of inhibitory agents.

The mutants, disclosed in Example 2 below, referred to as variants and identified as V–4, V–6 and V–8 were made by varying the concentration of one of the four ribonucleotide base components (CTP or ATP) required for the replication of the RNA during serial transfers. An additional mutant, V–9, was made using the four base components, but using a low concentration of ATP and a low concentration of the inhibitory agent tubercidin triphosphate (TuTP), a base analogue of ATP.

EXAMPLE 1

(A) Materials and methods (a) Enzyme, substrates, and assays: Synthesis of radioactive ribonucleotide triphosphates and liquid scintillation counting of labeled RNA on membrane filters have been detailed previously (Proc. Natl. Acad. Sci., U.S., 50, 905 (1963)). RNA from a temperature-sensitive mutant of Q$\beta$ (ts–1) was extracted from the virus as described previously (Science, 153, 64 (1966)). The first reaction in the series was initiated at a concentration of 0.2 $\mu$g./0.25 ml. of a standard (Proc. Natl. Acad. Sci., U.S. 54, 579 (1965)) reaction. The same replicase preparation purified through the CsCl and sucrose steps (Proc. Natl. Acad. Sci., U.S. 55, 1608 (1966)) was used in all steps of the transfer experiments to be described.

(b) Sedimentation analysis of products: Aliquots (0.01–0.10 ml.) were withdrawn from various reactions and adjusted to 0.2% (by weight) with respect to sodium dodecyl sulfate (SDS). Each sample was diluted to a final volume of 0.20 ml. in TE buffer (0.01 M Tris, pH 7.4, and 0.003 M EDTA), then layered on a 5-ml. linear gradient of sucrose (2–20% in 0.10 M Tris, pH 7.4, and 0.003 M EDTA). These gradients were centrifuged in a Spinco SW–39 rotor at 39,000 r.p.m. at 4° C. for 5 hr. Fractions of 0.25 ml. were collected dropwise, precipitated with 10% trichloroacetic acid (TCA), washed onto cellulose nitrate membrane filters, and counted in a Packard liquid scintillation counter.

(c) Gel electrophoresis: Unswollen ethylene diacrylate cross-linked polyacrylamide gels (3.6%) and pre-swollen N,N'-methylene-bis-acrylamide cross-linked polyacrylamide gels (2.4%) were prepared as described previously (J. Mol. Biol., 26, 373 (1967)). Electrophoresis runs were made at room temperature for 90 min., at 5 ma./gel and 50 volts for gels 0.7 cm. in diameter and 10 ma./gel for gels 0.9 cm. in diameter and 9 cm. in length.

Optical density measurements of gels were performed by scanning each gel (transferred to a quartz cell 0.5 cm. in depth) with transmitted ultraviolet light in a Joyce high-resolution "chromoscan" equipped with a 266-m$\mu$ interference filter. Frozen gels were sectioned in 0.5-mm. slices with the use of a carbon dioxide-cooled microtome (J. Mol. Biol., 26, 373 (1967)). Successive pairs of 0.5-mm. sections were placed in vials and eluted in TE or SSC (0.015 M sodium chloride and 0.015 M sodium citrate) buffers with gentle agitation for 12 hr. at 5° C. Aliquots were removed from each elution, precipitated with cold 10% TCA, washed onto cellulose nitrate membrane filters, and counted in a Packard Liquid scintillation counter (d) Ribonuclease resistance assays: Samples from each gel were adjusted to 0.15 M sodium chloride and 0.015 M sodium citrate, 20 $\mu$g./ml. pancreatic ribonclease, and 20 $\mu$g./ml. $T_1$ ribonuclease. After a 2-hr. incubation at 35° C., each sample was washed onto a cellulose nitrate membrane filter with cold 10% TCA, and counted in the Packard liquid scintillation counter. Heated (100° C. for 1 min.) and quick-cooled (in ice) samples were contained in TE buffer which was then adjusted to 0.15 M sodium chloride and 0.015 M sodium citrate for ribonuclease assay.

(e) Synthesis of RNA and infectious units: Samples were withdrawn and set aside for sedimentation analysis or gel electrophoresis from 0.125-ml. reaction volume (or half standard replicase reaction). Samples for infectivity assays were diluted into 0.003 M EDTA and treated as described by Pace and Spiegelman in Proc. Natl. Acad. Sci., U.S., 55, 1608 (1966).

(f) Base composition analysis: In addition to the standard components (Proc. Natl. Acad. Sci., U.S. 54, 579 (1965)) reaction solution for base composition analysis contained the four ribonucleotide triphosphates (labeled in the $\alpha$-phosphorus with $P^{32}$) at a specific activity of $7.35 \times 10^7$ c.p.m./0.2 $\mu$M for each triphosphate. The volume was 1.0 ml. and contained 160 $\mu$g. of replicase. The reaction was initiated with 0.3 $\mu$g. of gel purified single-stranded variant RNA obtained from the 74th transfer. After incubation at 35° C. for 40 min., the replicase reaction was terminated by rapid chilling to 0° and addition of SDS to a final concentration of 0.2%. The terminated reaction was dialyzed 12 hr. at 5° C. against 500 ml. TE buffer. This dialyzed solution was then reduced in volume to about 0.1 to 0.2 ml. with fine grade G-25 Sephadex and subjected to gel electrophoresis. RNA in the peak single-strand region was pooled and repurified by gel electrophoresis. The peak single-strand regions were again pooled. To remove any residue of labeled riboside triphosphate, bulk E. coli RNA was added to the major portion of the pool, precipitated with a solution of saturated sodium pyrophosphate, saturated sodium biphosphate, and saturated TCA (1:1:1 by volume), and washed onto a cellulose nitrate membrane filter with cold 10% TCA. The membrane was then cut into small pieces and eluted with 0.3 M aqueous potassium hydroxide. Three 1-ml. washes with 0.3 M KOH were used. These were pooled and incubated 12 hr. at 35°. Chromatographic analysis of the resulting 2'-3'-nucleotides was performed on a Dowex-formate column as detailed by Hayashi and Spiegelman at Proc. Natl. Acad. Sci., U.S. 47, 1564 (1961).

(B) Results (a) Selection during serial transfer: Each 0.25-ml. standard reaction mixture (Proc. Natl. Acad. Sci., U.S., 54, 579 (1965)) contained 40 μg. of Qβ replicase purified through CsCl and sucrose centrifugation, and ($P^{32}$) UTP (uridine triphosphate) at a specific activity such that 4,000 c.p.m. corresponds to μg. of synthesized RNA. The first reaction (0 transfer) was initiated by the addition of 0.2 μg. ts-1 (temperature-sensitive RNA) and incubated at 35° C. for 20 min., whereupon 0.02 ml. was drawn for counting and 0.02 ml. was used to prime the second reaction (1st transfer) and so on. After the first 13 reactions, the incubation periods were reduced to 15 min. (transfers 14–29). Transfers 30–38 were incubated for 10 min. Transfers 39–52 were incubated for 7 min., and transfers 53–74 were incubated for 5 min.

The first serial reaction (0th) was allowed to proceed 20 minutes at 35° C., whereupon a .20λ aliquot was used to seed the second, and so on for the first 13 reactions. The incubation periods were then reduced. These periodic reductions in the incubation intervals between transfers were instituted in an attempt to maintain the selection pressure for the most rapidly multiplying molecules.

The synthesis of biologically competent RNA ceased between the fourth and fith transfers. Second, a dramatic increase in the rate of incorporation of $P^{32}$ UTP into RNA occurred between transfers 8 and 9. Last, an apparent decrease in the rate of RNA synthesis, coinciding with the reduction in the incubation time from 15 minutes to 10 minutes, occurred after transfer 29.

The RNA products from the reactions were expanded by using them to initiate new replicase reactions which were continued for 40 minutes at 35° C. The resulting products were then examined in sucrose gradients. The product obtained from the reaction initiated by the 0th transfer shows (sedimentation analysis of first transfer reaction) the 28S peak characteristic of Qβ-RNA as well as the peaks corresponding to the usual complexes observed during the in vitro synthesis (Proc. Natl. Acad. Sci., U.S., 56, 1778 (1966)). Comparison with subsequent transfers reveals, however, dramatic changes in the nature of the replicating entity. Thus, by the ninth transfer there is no material synthesized corresponding to the original 28S viral RNA. In its place we see a major component at about 20S product and a minor one at about 15S product. This pattern is essentially maintained through the 15th transfer.

By the 30th transfer the major component has decreased to 15S and the minor one to about 14S. The product of the 38th transfer shows variant RNA which no longer splits into two peaks, a feature retained through subsequent transfers. It will be noted with respect to the sedimentation analysis of the 54th transfer and 75th transfer reaction products, however, that the single peak moves more slowly so that by the 74th transfer it is at about 12S.

(b) Gel electrophoresis of variant RNA: At this point it was decided to examine the nature of the variant in greater detail. Transfer 75 was expanded with replicase to a total of 120 μg. of RNA and subjected to analysis by polyacrylamide gel electrophoresis of $H^3$ CTP-labeled 75th transfer reaction product. Clearly, the apparently homogeneous peak of the 75th transfer reaction product is composed of at least two distinct RNA species. The major component is sensitive to ribonuclease whereas the minor one is resistant. It would appear that the faster component is the single-stranded variant and that the slower minor peak contains a mixture of the Hofschneider (J. Mol. Biol., 16, 544 (1966)) and Franklin (Proc. Natl. Acad. Sci., U.S., 55, 1504 (1966)) structures observed first in vivo and seen in in vitro synthesis of Qβ-RNA with purified replicase (Proc. Natl. Acad. Sci., U.S., 56, 1778 (1966) and 57, 1474 (1967)).

(c) Molecular weight of variant RNA: It has been previously shown (J. Mol. Biol., 26, 373 (1967)) that the relative electrophoretic mobility (REM) is linearly related inversely to the molecular weight of single-stranded RNA. Consequently, to determine the molecular weight, the single-stranded variant RNA was subjected to gel electrophoresis with seven internal marker RNA's of known size. The results indicate that the variant RNA has a molecular weight of about $1.7 \times 10^5$ daltons.

(d) Base composition of variant RNA: To determine its base composition, a standard reaction mixture was initiated with the variant isolated by gel electrophoresis. In this reaction, all four ribonucleotide triphosphates were labeled with $P^{32}$ at the α-position (see (A)(f) above). The RNA product of this reaction was purified twice by gel electrophoresis, hydrolyzed, and analyzed as described in (A)(f) above. Comparison with the base composition of the original Qβ-RNA (Table I below) indicates that there has been a considerable (5 mole percent) increase in the G content in the variant RNA. On the other hand, A and C have decreased by 2.4 mole percent, the uridine content remaining constant.

With respect to Table 1 below, RNA uniformly labeled with $P^{32}$ was prepared, purified, and analyzed as described in (A)(f) above. The resulting data are given in the first line. To monitor the quantitative adequacy of the analysis a parallel experiment was carried out with a similarly prepared and uniformly labeled 28S Qβ-RNA (second line, Qβ-RNA-1). The last line (Qβ-RNA-2) gives for comparison the base composition of RNA isolated from virus particles (J. Bacteriol., 91, 442 (1966) and 92, 739 (1966)). The numbers represent mole percent of the corresponding basis.

TABLE I
Base composition of variant RNA

| RNA | C | A | U | G |
| --- | --- | --- | --- | --- |
| Variant-1 (75th variant) | 22.3 | 19.7 | 29.3 | 28.7 |
| Qβ-RNA-1 | 25.0 | 22.5 | 29.5 | 23.0 |
| Qβ-RNA-2 | 24.7 | 22.1 | 29.1 | 23.7 |

(e) Kinetics of Qβ and variant RNA: A comparison of the kinetics of synthesis at saturation of the 75th variant and the original ts-Qβ-RNA reveals some interesting differences. It was noted that the Qβ-RNA shows the usual six minutes of nonlinear synthesis which precedes the linear phase. The variant had decreased this apparent lag to 1.5 minutes. Further, the slope of the linear portion of the variant synthesis was 2.6 times that of the original Qβ-RNA. Since the variant was only 17 percent of the original size, its growth rate in terms of the production of new individuals was 15 times that of the complete viral RNA molecules.

(C) Discussion

One of the purposes of this example was to demonstrate the potentialities of the replicase system for examining the extracellular evolution of a self-replicating nucleic acid molecule. Further, the experimental situation provides its own paleology; every sample is kept frozen and can be expanded at will to yield the components occurring at that particular evolutionary stage. While only seven such samples are detailed here, they indicate that progress to a small size occurs in a series of steps. It should be noted that the enzyme reaction can be modified so that this process is greatly accelerated. This involves changing the proportions of the two components (Proc. Natl. Acad. Sci., U.S., 57, 1833 (1967)) of the Qβ-replicase and will be reported subsequently.

The last product examined is a molecule which has eliminated 83 percent of its original length and has experienced a significant change in base composition. The fact that it replicates 15 times faster than the complete viral RNA suggests that in addition to becoming smaller, the variant has increased the efficiency with which it interacts with the replicase. In any event, it has been established that neither the specific recognition nor the replicating mechanism requires the complete original sequence. In this connection, it should be noted that although abbreviated, these variants are not equivalent to random fragments. The latter are unable to complete the replicative act (Proc. Natl. Acad. Sci., U.S., 54, 1189 (1965)).

The availability of a molecule which has discarded large and unnecessary segments provides an object with obvious experimental advantages for the analysis of many aspects of the replicative process. Finally, these abbreviated RNA molecules have a very high affinity for the replicase but are no longer able to direct the synthesis of virus particles. This feature opens up a novel pathway toward a highly specific device for interfering with viral replication.

The evolutionary consequences for a self-duplicating nucleic acid molecule put under selection pressure for fast growth has thus been explored. As the experiment of Example 1 progressed, the rate of RNA synthesis increased and the product became smaller. By the 74th transfer the replicating molecule had eliminated 83 percent of its original genome, becoming the smallest known self-duplicating entity.

Aside from their intrinsic interest, experiments such as shown in Example 1 can provide insight into a number of central issues. Thus, they can tell us the smallest self-duplicating entity which can be constructed by such devices and provide much simpler objects for analyzing the replication process. Further, the sequences involved in the recognition mechanism between template and enzyme are enriched in the smaller molecules which evolve. Finally, these abbreviated molecules have a very high affinity for the replicase but are no longer able to direct the synthesis of virus particles. This feature opens up a novel pathway toward a highly specific device for interfering with viral RNA replication.

EXAMPLE 2

MATERIALS AND METHODS

All quantities are expressed per 0.125 ml. standard reaction mixture.

Standard reaction mixture: 10.5 $\mu$moles Tris-HCl pH 7.4, 2.0 $\mu$moles $MgCl_2$, 0.375 $\mu$mole EDTA (ethylenediamine tetraacetic acid), 100 m$\mu$moles each of ATP, CTP, GTP, UTP, and 20–40 $\mu$g. Qβ-replicase. One of the nucleoside-triphosphates added was radioactively labeled with either $H^3$ in the base or $P^{32}$ in the α-phosphorous. Deviations from standard reaction mixture will be noted and involve lowering the concentrations of one of the four nucleoside-triphosphates. All incubations were at 38° C.

Enzyme: Qβ-replicase purified (Haruna and Spiegelman, Proc. Natl. Acad. Sci., U.S., 54, 579 (1965)) twice on DEAE was used as described by Levisohn and Spiegelman in Proc. Natl. Acad. Sci., U.S., 60, 866 (1968).

Gel electrophoresis: Electrophoresis through 3.6% preswollen 0.9 x 6.0 cm. bis-acrylamide cross-linked polyacrylamide gels was carried out for 2 hr. at 10 mamp/gel as described by Bishop, Claybrook, and Spiegelman, J. Mol. Biol., 26, 373 (1967). Slices of 0.5 mm. were made from frozen gels dried, dissolved for 6 hr. at 80° C. in 30% $H_2O_2$ and counted in liquid scintillation fluid.

Base ratios: The determinations were performed on purified "plus" strands (Bishop, Mills, and Spiegelman, Biochem, 7, 3744 (1968)), following a reaction in which all four nucleoside-triphosphates were equally labeled with $P^{32}$ in the α-phosphorous. Following alkaline hydrolysis the mononucleotides were separated by paper electrophoresis and determined according to Sanger, Brownlee, and Barrell, J. Mol. Biol., 13, 373 (1965).

Purification of variant RNA: Reactions were stopped by a five-fold dilution into a mixture of: 0.01 M Tris pH 7.4, 0.2 M NaCl, 0.003 M EDTA and 0.2% SDS (sodium dodecyl sulfate). This was followed by two phenol extractions and three alcohol precipitations.

Selection and isolation of variants: A reaction product of a previously isolated variant was inoculated at a concentration of 0.005 $\mu$g./0.125 ml. into a reaction mixture of the specified selective medium. During incubation at 38° C., samples were taken out periodically, a portion being diluted at least 100 fold in 0.01 M Tris-HCl pH 7.4+0.003 M EDTA and frozen and another aliquot assayed for cold trichloracetic acid (TCA) insoluble material.

Variants were isolated in the course of serial transfer experiments as modified by Levisohn and Spiegelman in Proc Natl. Acad. Sci., U.S., 60, 866 (1968). Each transfer employed diluted product of the reaction just completed in which 0.075–0.15 $\mu$g. of RNA had been synthesized. The dilution factor between transfers was gradually increased to $1 \times 10^{11}$. Finally, the product of the last transfer was cloned (Levisohn and Spiegelman, Proc. Natl. Acad. Sci., U.S., 60, 866 (1968)).

RESULTS (A) "Nutritional" mutants

Isolation: One rather general approach for obtaining a variety of mutants is to run the syntheses under less than optimal conditions with respect to a parameter of the reaction or the stoichiometric concentration of components needed for the reaction. If a variant arises which can cope with the imposed suboptimal situation, continued transfer should lead to its selection over wild type. An illustration of how this can be done with variations in the levels of the riboside triphosphates is now described.

Figure 1:
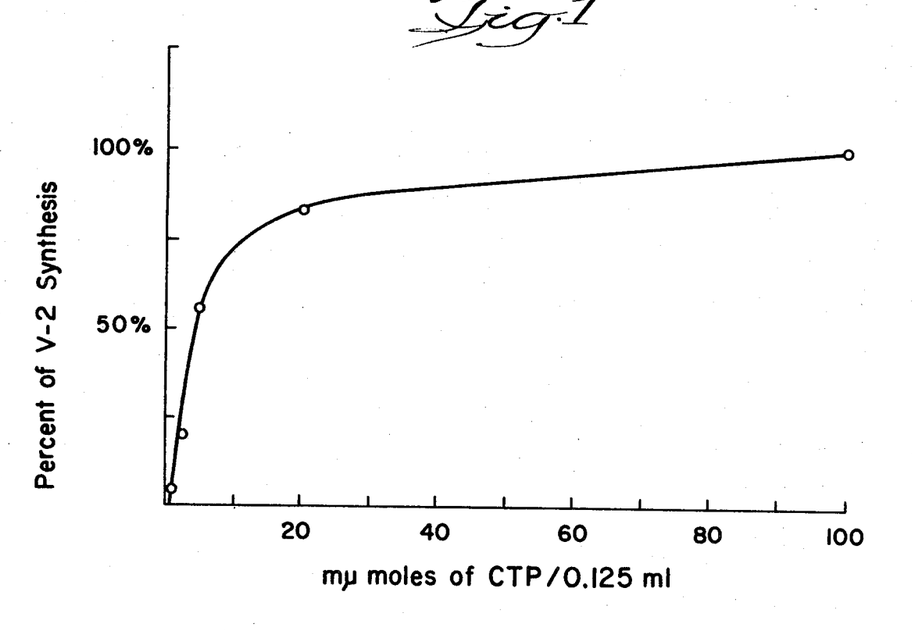
FIG. 1 illustrates the relation between the concentration of CTP in the reaction mixture and the amount of V–2 synthesized therein.

The effect of limiting the concentration of CTP during the replication of V–2 was studied and is shown in FIG. 1. Reaction mixtures of 0.125 ml. containing the indicated concentrations of CTP and otherwise identical to "standard reaction mixture" were incubated for 30 minutes at 38° C. with 20 $\mu$g. Qβ-replicase and 0.01 $\mu$g. variant-2 RNA. Subsequently, the acid-insoluble radioactivity was determined. In the "complete medium" (containing 100 m$\mu$moles CTP), 1.6 $\mu$g. of V–2 RNA were synthesized.

As may be seen from FIG. 1, the rate of synthesis of V–2 begins to decrease sharply as the level of CTP drops below 20 m$\mu$moles per 0.125 ml. At a CTP concentration of 2 m$\mu$moles, the rate of synthesis of V–2 is only 25% of normal. At 1 m$\mu$mole of CTP the rate decreases to 5% of normal.

With this information available, a search was made for variants which could replicate better than V–2 on limiting levels of CTP. A serial transfer experiment at 2 m$\mu$moles of CTP per reaction was initiated with Qβ-RNA, culminating after 10 transfers with the appearance of V–4. A second series of transfers at 1 m$\mu$mole of CTP per reaction was then started with V–4 and after 40 transfers, led to the isolation of V–6.

Figure 2:
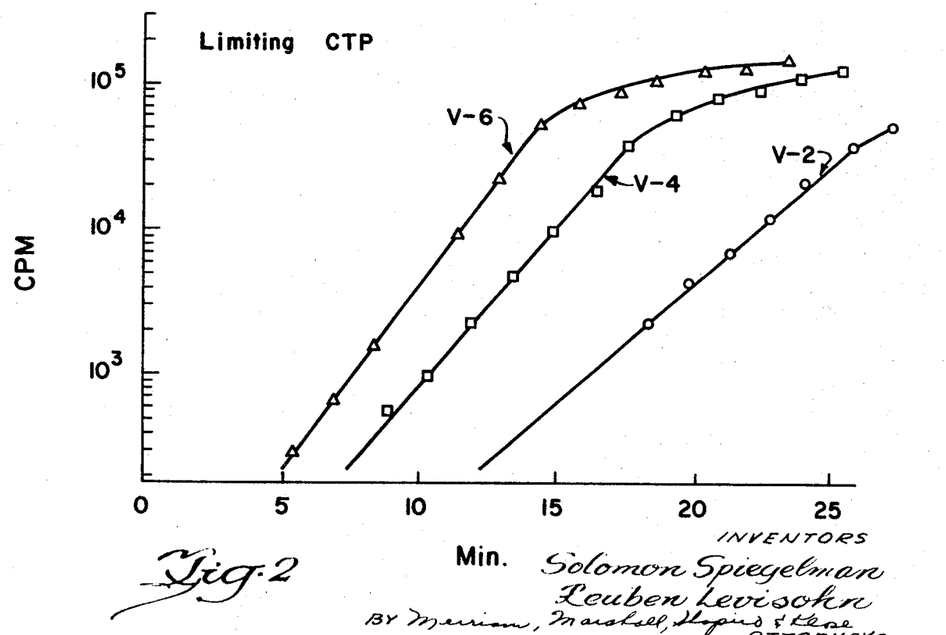
FIG. 2 illustrates the effect of the concentration of CTP on the rate of synthesis of V–2, V–4 and V–6.

FIG. 2 describes the replication of variants-2, -4 and -6 in limiting CTP (1 m$\mu$mole per 0.125 ml.). The slopes of the semi-log plots permits an estimation of the doubling times during logarithmic increase as 1.81 minutes for V–2, 1.41 minutes for V–4, and 1.16 minutes for V–6.

Evidently both V-4 and V-6 possess a heritable feature which permits them to overcome the disadvantages imposed by the low level of CTP.

In the experiment depicted by FIG. 2, a reaction mixture containing only 1 mµmole (instead of 100 mµmoles) CTP including $2.2 \times 10^5$ c.p.m. $H^3$-CTP, was incubated at 38° C. with 40 µg. Qβ-replicase and 0.001 µg. of purified V-2, V-4 or V-6 RNA. The amount of trichloracetic acid insoluble radioactive material was determined at the indicated times. In this experiment $1.7 \times 10^5$ c.p.m. is equivalent to 1 µg. of variant RNA.

The basis of the mutant phenotype: The fact that variants-4 and -6 replicate 28% and 56% better, respectively, than V-2 at low levels of CTP might be explained on the basis of smaller sizes or modification of base composition towards a lower cytosine content.

Figure 3:
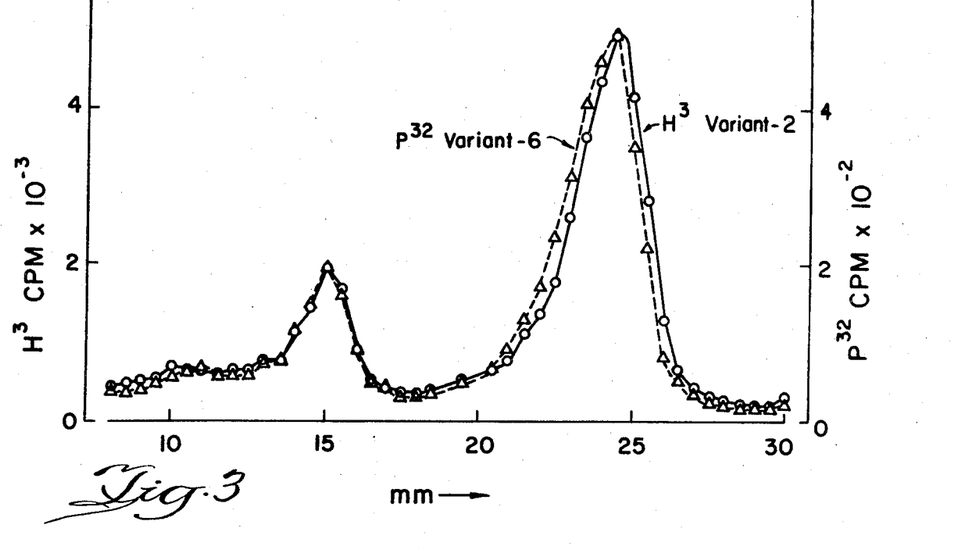
FIG. 3 illustrates the size of V–2 and V–6 on polyacrylamide gels.

FIG. 3 compares the sizes of V-2 and V-6 on polyacrylamide gels and shows that there is no significant difference in chain length. It may be noted that similar comparisons revealed very little change in length in any of the variants thus far selected.

In the experiment depicted by FIG. 3, standard reaction mixtures of 0.125 ml. initiated with 0.001 µg. of V-2 in the presence of $2.2 \times 10^6$ c.p.m. $H^3$-UTP, or 0.001 µg. of V-6 in the presence of $2 \times 10^5$ c.p.m. $P^{32}$-UTP were incubated for 18 and 13 minutes, respectively. The reactions were terminated with 0.01 ml. of 2.5% sodium dodecyl sulfate and mixed together. The mixture was electrophoresed through polyacrylamide gels and processed as described above.

Table II below compares the base composition of V-2 and V-6. Here again, no significant differences are detectable. The base composition of purified "plus" strands of variant-2 and variant-6 were determined as described above, and the numbers in the table represent mole percent of base component. The mutants V-2 and V-6 are independent isolates and are separated by two lengthy and severe selections on limiting CTP; no reflection of this is seen in the base compositions of V-2 and V-6. It should be noted that the sensitivity of comparing the base components of V-2 and V-6 is of the order of 0.5% and changes involving a small number of residues would be difficult to detect.

TABLE II

Base ratios of variants

| Base | V-2 | V-6 |
|---|---|---|
| C | 24.8 | 24.8 |
| A | 23.2 | 23.5 |
| G | 26.6 | 26.7 |
| U | 25.4 | 25.1 |

It is evident that the modifications leading to the properties possessed by variants-4 and -6 do not involve massive modifications in the composition of the molecule. The identification of the changes require more subtle examinations such as oligonucleotide finger print patterns.

The fact that the most obvious pathways for solving the problem of low CTP were not employed, leads to a consideration of more sophisticated devices for achieving the desired end result. It is useful here to recall that the mutant RNA molecules must complex with the replicase. Thus, changes of sequence which would leave such gross features as base composition and size unchanged, could, nevertheless, lead to different secondary structures of the mutant molecules. These in turn could have allosteric effects on the replicase, permitting the complex to employ CTP more effectively at suboptimal concentrations. If this were the case, and if there were a common site for the four riboside triphosphates analogous to the DNA polymerase (Atkinson, Huberman, Kelley, and Kornberg, Fed. Proc., 28, 347 (1965)), it might be expected that a mutant selected for better replication on low CTP would also exhibit increased capacities to accommodate to low levels of the other riboside triphosphates.

Table III below summarizes data comparing the logarithmic synthesis of variants V-4 and V-6 with that of V-2 on limiting levels of each of the four riboside triphosphates. The data shown in Table III are based on the experiment shown in FIG. 2 and similar experiments performed in standard reaction mixture and in reaction mixtures with only 4 mµmoles ATP, 9 mµmoles GTP or 2 mµmoles UTP. The data show that the two variants selected on low CTP also do much better on limiting concentrations of the other three substrates. More definitive delineation of the underlying mechanism will require binding studies of substrates with enzyme complexed to mutant and wild type templates.

TABLE III

Logarithmic synthesis of variant RNA on limiting media

| Limiting nucleotides | Mµ moles | Variant | Doubling time in minutes | Relative slope Compared to V-2 | Relative slope Compared to V-4 |
|---|---|---|---|---|---|
| None | 100 | 2 | 0.42 | 1.00 | |
|  |  | 4 | 0.42 | 1.00 | 1.00 |
|  |  | 6 | 0.35 | 1.21 | 1.21 |
| ATP | 4 | 2 | 2.41 | 1.00 | |
|  |  | 4 | 1.54 | 1.56 | 1.00 |
|  |  | 6 | 1.47 | 1.64 | 1.05 |
| CTP | 1 | 2 | 1.81 | 1.00 | |
|  |  | 4 | 1.41 | 1.28 | 1.00 |
|  |  | 6 | 1.16 | 1.56 | 1.21 |
| GTP | 9 | 2 | 3.05 | 1.00 | |
|  |  | 4 | 2.25 | 1.35 | 1.00 |
|  |  | 6 | 2.31 | 1.31 | 0.97 |
| UTP | 2 | 2 | 2.06 | 1.00 | |
|  |  | 4 | 1.69 | 1.22 | 1.00 |
|  |  | 6 | 1.54 | 1.33 | 1.09 |

(B) Selection of a variant resistant to an inhibitory analogue

Figure 4:
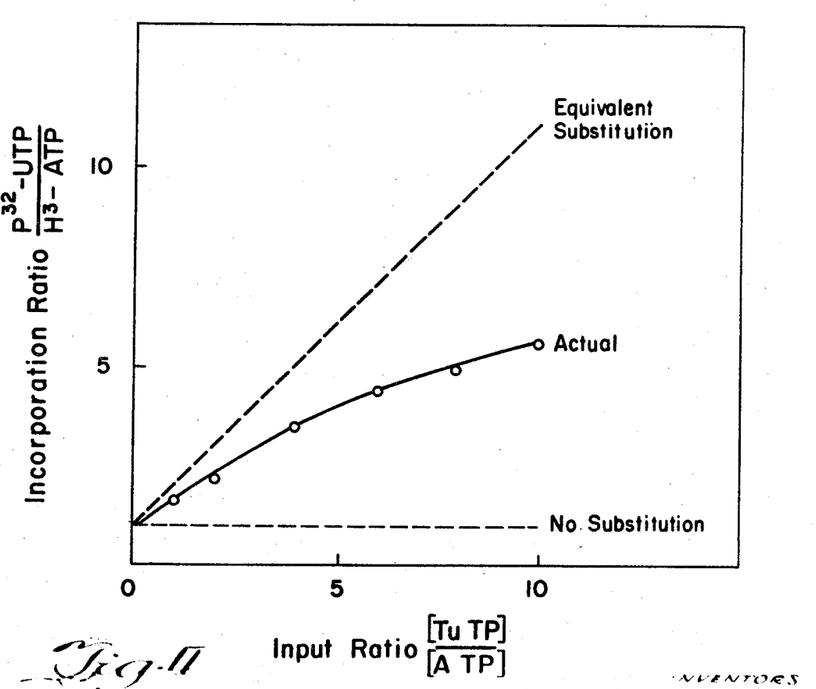
FIG. 4 illustrates the relative amount of UTP/ATP incorporated in V–8 relative to the amount of TuTP (tubercidin triphosphate) in the system.

Tubercidin is an analogue of adenosine in which the nitrogen atom in position 7 is replaced by a carbon atom. Tubercidin triphosphate (TuTP) inhibits the synthesis of Qβ-RNA in vitro. TuTP cannot completely replace ATP in the reaction. It is clear, however, from the following indirect experiment that it is incorporated into the growing chains. A series of reactions were run at increasing levels of TuTP in the presence of fixed amounts of $P^{32}$-UTP and $H^3$-ATP. The latter permits determination of the U to A ratio in the product. FIG. 4 shows the outcome which indicates that TuTP can replace A but with a probability lower than unity.

In the experiments depicted by FIG. 4, synthesis of RNA templated by 0.001 µg. V-8 RNA in the presence of 40 µg. Qβ-replicase was allowed to take place for 40 minutes in a reaction mixture containing 5 mµmoles ATP, the indicated amount of TuTP, and $H^3$-ATP and $P^{32}$-UTP. The U to A ratio in "plus" strands of the variant is 6/5, which may be taken as unity. If tubercidin can replace adenosine with equal probability, the U to A ratio in the product should vary with the ratio of TuTP to ATP in the reaction mixture in the manner described by the upper dotted curve (labeled "Equivalent Substitution"). If there is no substitution of adenosine by tubercidin, the ratio of U to A should remain normal and independent of the relative amount of TuTP present (lower dotted curve labeled "No Substitution"). The unbroken line indicates the actual incorporation ratio corrected for an input of $6 \times 10^5$ c.p.m./100 mµmoles $P^{32}$-UTP and $5 \times 10^5$ c.p.m./100 mµmoles $H^3$-ATP.

It was of some interest to see whether a mutant could be derived which would show resistance to the presence of this agent. In such experiments, it is desirable to have the ratio of the analogue to ATP as high as possible. To attain this more readily, a variant was isolated on limiting ATP concentration. Variant-6 was chosen to start a series of transfers in a reaction mixture containing 1.5 mµmoles of TAP and this led to the isolation of V-8. The doubling time of V-8 in the reaction mixture with 1.5 mµmoles of ATP was 2.8 minutes as compared with 8.4 minutes for V-6, the starting variant.

The replication rate of V-8 on a reaction mixture containing 5 mµmoles of ATP was inhibited 4-fold upon the addition of 30 mµmoles of TuTP. A serial transfer was initiated with V-8 on the inhibitory medium and led to the isolation of V-9. The doubling time of V-9 in the presence of TuTP was 2.0 minutes as compared with 4.1 minutes for V-8. In the absence of TuTP, both variants are synthesized with a 1.0 minute doubling time. It is clear that V-9 exhibits a specifically increased resistance to the inhibitory effect of TuTP. The resistance mechanism does not involve a more effective exclusion of TuTP as measured by an experiment similar to that described in FIG. 4. Thus, at 30 mµmoles of TuTP and 5 mµmoles of ATP, the ratio of U to A in the product was 3.6 for V-8 and 3.5 for V-9, the resistant mutant.

Table IV below lists the variants isolated in the experiments described in Example 2 and summarizes the relevant information on their origins and conditions of selection. Variants were selected on standard reaction mixture, or on a standard reaction mixture modified to contain one of the four nucleoside-triphosphates at the indicated concentration. Starting with the RNA's indicated in column 3 of Table IV, a series of transfers were made with reaction product, diluted $1.25 \times 10^4$ fold, as described above. Subsequently, the dilution factor between transfers was gradually increased to about $1 \times 10^{11}$.

It will be noted that V-4 is an independent derivative from the parental Qβ-RNA. Another variant V-3 (not shown) was isolated with limiting CTP starting with V-2 instead of Qβ-RNA. V-3 possessed phenotypic properties indistinguishable from those of V-4. Thus, the V-4 phenotype can be arrived at either from Qβ-RNA or from V-2. It seems probable that Qβ-RNA passes through the V-2 stage before arriving at the V-4 phenotype.

TABLE IV

Conditions used in isolation of variants

| Variant | Selective limitations | RNA used to start selection | No. of transfers at dilution of $1.25 \times 10^4$ | Total No. of transfers |
| --- | --- | --- | --- | --- |
| V-2* | None | Qβ | | 17 |
| V-4 | 2 mµmoles CTP | Qβ | 5 | 10 |
| V-6 | 1 mµmoles CTP | V-4 | 30 | 40 |
| V-8 | 1.5 mµmoles ATP | V-6 | 11 | 16 |
| V-9 | {5 mµmoles ATP, +30 mµmoles TuTP} | V-8 | 15 | 19 |

*Levisohn and Spiegelman, Proc. Natl. Acad. Sci., U.S., 60, 866 (1968).

The comparatively conservative nature of the replicative process is illustrated by the virtual identity of base compositions of V-2 and V-6 seen in Table II above. These two mutants are independent isolates and are separated by two lengthy and severe selections on limiting CTP. No reflection of this is seen in the base compositions of the two.

It will be of enormous interest to compare the actual sequence changes amongst the mutants differing in their relatedness and phenotypic properties. With this information available, one can begin to construct the probable secondary structure modifications. Only then can an attempt be made to understand the molecular basis of these new phenotypes.

As pointed out above, extracellular Darwinian selections may mimic one aspect of precellular evolution, i.e., when environmental selection operated only on the replicating gene and not on the gene product. Such experiments provide some insight into the rules of these early stages of evolution. It was not a priori obvious what kinds of selective forces could be operative since much depended on how many different ways a molecule could be selected as superior by the environment. The work reported here reveals an unexpected wealth of phenotypic differences which a replicating nucleic acid molecule can exhibit. It is apparent that many of these phenotypic differences involve interaction between nucleic acid molecules and a highly evolved protein catalyst (i.e., replicase enzyme). However, it is possible to imagine similar types of interactions with a primitive surface catalyst. Sequence changes which would increase slightly the catalytic effectiveness could have powerful selective effects in these precellular stages of evolving genetic materials.

It is apparent from the work discussed above that a host of new mutant types possessing predetermined phenotypes can be isolated by varying other parameters of the system. In addition, one can expand the possibilities by introducing initially neutral agents (e.g., proteins) with which the replicating molecules may interact. Selection can then be exerted to favor variants that can induce these foreign agents to become participants in the replicative process.

Finally, the pharmacological or pharmaceutical significance of the mutant resistant to the inhibitory agent should be noted.

As pointed out above and in U.S. Patent 3,444,044, abbreviated variants possess a number of features which make them potentially powerful tools as chemotherapeutic agents. They combine a very high affinity for the replicase and a rapid growth rate. The variants or mutants compete effectively with the normal biral nucleic acid for the replicase and thus effectively hinder the progress of virus production.

A third feature can now be added, namely, resistance of the mutant or variant to an inhibitory agent known to be effective against the original virus particle.

All these features can be built into one mutant or variant by the kinds of serial selections described herein. This adds another dimension to the proposed use or scope of use of these agents as chemotherapeutic devices.

Reference herein to a standard or normal reaction mixture or medium sometimes refers to a complete in vitro enzymatic synthesizing system or medium which has been found to replicate RNA at a rapid rate to provide favorable yields of RNA. A standard or normal reaction mixture or medium includes a concentration of base components which is higher than the minimum concentration required for replication, but below a concentration which would inhibit synthesis. The particular standard reaction mixture referred to in Example 2 contained, among other things, 100 mµmoles per 0.125 ml. of standard reaction mixture of each of ATP, CTP, GTP and UTP.

In order to obtain a mutant of RNA in vitro, one has to get a mutation leading to a mutant and provide selective conditions for enriching the mutant.

Mutations which lead to the synthesis of mutants can be obtained either spontaneously (as in Example 2), or the mutation frequency can be increased by the use of chemical or physical mutagens or mutagenic conditions such as UV radiation, X-rays, heat, change of pH, base analogues, chemicals which affect base components, changing the magnesium concentration, adding manganese, etc.

Conditions for enriching mutants can be obtained, for example, by changing the concentration of one or more of the base components in the standard reaction mixture (e.g., ATP and CTP were limited in Example 2), adding inhibitory base analogues (e.g., tuberciden triphosphate was used in Example 2), including other chemicals (including enzymes) that change the rate of RNA synthesis, or using physical agents or conditions which affect the rate of synthesis (e.g., different pH, changing the temperature, etc.).

Mutant variants were produced by in vitro enzymatic synthesizing systems in Example 2 by lowering the standard or normal reaction mixture concentration of one of the base components (CTP and ATP) and without using an inhibitory agent. The abbreviated mutants obtained are biologically active as evidenced by their ability to replicate and produce replicas; however, they are defective or non-competent in that they cannot yield complete virus particles.

Variant-8 was selected in an in vitro enzymatic synthesizing system in which the concentration of ATP was lowered. This variant was used in an in vitro enzymatic synthesizing system with a low concentration of ATP to which a low concentration of TuTP (tubercidin triphosphate, which is an analogue of the base component ATP) was added, to select for V–9. Variant-9 was more resistant to the inhibitory agent than its predecessor parent variant, V–8, and replicated faster than V–8 in the presence of TuTP.

The mutants or variants can be replicated continuously, as desired, in vitro in an enzymatic synthesizing system.

For the work described in Example 2, only a small amount of TuTP was available; therefore, only a lower concentration of TuTP could be used for the selection. In order to maintain a sufficiently high ratio of TuTP/ATP, a low concentration of ATP was used. If enough base analogue is available, a sufficiently high concentration of the base analogue can be used for selection of a mutant variant so as not to necessitate varying of the concentration of a normal base component.

TuTP can be incorporated into the RNA of V–8 and V–9 because it is an analogue of ATP. However, it is not essential that the selected inhibitory agent be a base analogue or that it becomes incorporated into the RNA chain of the variant RNA.

A mutant RNA has also been obtained having enhanced resistance to the inhibitory activity of ethidium bromide, which is not a base analogue.

If one uses two or more base analogues as inhibitory agents, one may obtain a RNA mutant which is resistant to many agents. For example, in a serial procedure, a mutant would be obtained in vitro in the presence of one base analogue; the new mutant would be then grown in vitro in the presence of a second base analogue, to select for a second mutant which is resistant to both inhibitory agents; the second mutant then can be used to start a selection for a third mutant which is resistant to a third inhibitory agent. The same procedure can be followed to produce mutants which are resistant to inhibitory agents other than base analogues.

The mutants or variants selected thus should be synthesized in vitro under selective conditions designed to lead to the isolation of mutants which compete successfully with the original or parent RNA under normal or selected conditions of replication. In the work shown in Example 2, the selective conditions were controlled so that the mutant took over the in vitro enzymatic synthesizing system so that the synthesized variant multiplied much faster than the original or parent viral RNA.

As demonstrated above, a variety of mutant RNA molecules can be isolated in vitro which exhibit qualitatively distinguishable phenotypes. This showed the significant flexibility of selected in vitro enzymatic synthesizing systems for synthesizing mutant RNA molecules which can be synthesized, isolated, and screened or used for chemotherapeutic activity.

Once one knows and selects the particular conditions under which the competition will take place in the in vitro enzymatic system, which in Example 2 would be with respect to the concentrations of the riboside triphosphates and the presence or absence of a selected inhibitory agent, one can construct a mutant RNA which possesses precisely those properties or characteristics which will allow the mutant to grow optimally under those conditions and thereby obtain a mutant which is capable of most effectively competing with the disease or virus to be combatted.

The above work, among other things, opens up a new chemotherapeutic approach for combatting in animals, the multiplication or propagation of infectious disease agents which contain RNA as their genetic material by a procedure which involves administering to the infected animal a selected mutant RNA derived or descended from the infectious RNA. The mutant RNA selected must outcompete with or against the infectious RNA for the services of their common specific replicase.

When the selected RNA mutant is synthesized or replicated in vitro in the presence of a selected or conventional chemotherapeutic or viral inhibitory drug or agent (e.g., base analogue) which itself combats the virus, the recovered or isolated mutant RNA will be resistant to the inhibitory activity of that agent and the mutant can be administered later to infected cells, in conjunction with or in the presence of the agent, for the purpose of outcompeting with the original or parent viral RNA for the services of the replicase in the presence of the agent. The mutant would be uninhibited (or inhibited less than the infecting agent) by the chemotherapeutic or anti-viral activity of the inhibitory agent which in turn would be effective in combatting the virus. The mutant and inhibitory agent could thus jointly combat the virus in vivo, although by different mechanisms.

In selecting a mutant RNA derived or descended from viral RNA for combatting a viral disease in animals, one should obtain a mutant RNA being capable of replicating fastest in the infected animal and having the greatest affinity for the common specific replicase for the mutant RNA and the parent viral RNA. That is, the best mutant RNA for evaluation purposes should be noninfectious and outcompete with the viral RNA for the services of their common specific replicase and replicate fastest under the conditions existing in the diseased animal.

The mutant selected for chemotherapeutic purposes or evaluation must retain that recognition structure of the original or parent RNA which dictates that the replicase direct the favorable replication of the mutant under the conditions selected or sought. The mutant otherwise should be as dissimilar as possible in structure and information from the original or parent RNA from which it was derived or descended and to be combatted in the diseased animal, must have no more than a low level of toxicity to the diseased animal, must grow favorably in the diseased animal, should be resistant to degrading or destructive enzymes which may exist in the diseased animal, and should be resistant to other drugs or inhibitory agents which are administered to the diseased animal, such as chemotherapeutic or virus inhibitory agents which combat the viral disease.

In addition to the pharmacological or chemotherapeutic significance and implications of our invention, our invention provides an additional important tool or model for the further study of the mechanism and nature of RNA replication.

In the claims, reference to an in vitro enzymatic synthesizing system is intended to include the use of systems involving a one-step or serial transfer or serial selection.

The forms of the invention herein shown and described are to be considered only as illustrative. It will be apparent to those skilled in the art that numerous modifications may be made therein without departure from the spirit of the invention or the scope of the appended claims.

What is claimed is:

1. A synthesized and isolated clone of biologically active mutant RNA descended in vitro from a biologically active parent RNA.

2. The synthesized and isolated clone of biologically active mutant RNA of claim 1 wherein said mutant replicates faster than the biologically active RNA from which it is descended.

3. An in vitro synthesized and isolated biologically active mutant RNA which replicates faster than a biologically active parent RNA from which it is descended in the presence of a selected inhibitory agent which combats the replication of said parent RNA.

4. An in vitro synthesized and isolated biologically active mutant RNA which replicates faster than a biologically active parent viral RNA from which it is descended in the presence of a selected inhibitory agent which combats the replication of said parent viral RNA.

5. An in vitro synthesized and isolated biologically active non-infectious non-competent mutant viral RNA which replicates faster than a biologically active parent viral RNA from which it is descended in the presence of a selected inhibitory agent which combats the replication of said parent viral RNA.

6. An in vitro synthesized and isolated biologically active abbreviated mutant RNA which replicates faster than a biologically active parent RNA from which it is descended in the presence of a selected inhibitory agent which combats the replication of said parent RNA.

7. An in vitro synthesized and isolated biologically active abbreviated mutant RNA which replicates faster than a biologically active parent viral RNA from which it is descended in the presence of a selected inhibitory agent which combats the replication of said parent viral RNA.

8. An in vitro synthesized and isolated biologically active non-infectious non-competent abbreviated mutant viral RNA which replicates faster than a biologically active parent viral RNA from which it is descended in the presence of a selected inhibitory agent which combats the replication of said parent viral RNA.

9. The combination of an in vitro synthesized and isolated biologically active mutant RNA which replicates faster than a biologically active parent RNA from which it is descended in the presence of a selected inhibitory agent which combats the replication of said parent RNA, and said inhibitory agent.

10. The combination of an in vitro synthesized and isolated biologically active mutant RNA which replicates faster than a biologically active parent viral RNA from which it is descended in the presence of a selected inhibitory agent which combats the replication of said parent viral RNA, and said inhibitory agent.

11. The combination of an in vitro synthesized and isolated biologically active non-infectious non-competent mutant viral RNA which replicates faster than a biologically active parent viral RNA from which it is descended in the presence of a selected inhibitory agent which combats the replication of said parent viral RNA, and said inhibitory agent.

12. The combination of an in vitro synthesized and isolated biologically active abbreviated mutant RNA which replicates faster than a biologically active parent RNA from which it is descended in the presence of a selected inhibitory agent which combats the replication of said parent RNA, and said inhibitory agent.

13. The combination of an in vitro synthesized and isolated biologically active abbreviated mutant RNA which replicates faster than a biologically active parent viral RNA from which it is descended in the presence of a selected inhibitory agent which combats the replication of said parent viral RNA, and said inhibitory agent.

14. The combination of an in vitro synthesized and isolated biologically active non-infectious non-competent abbreviated mutant viral RNA which replicates faster than a biologically active parent viral RNA from which it is descended in the presence of a selected inhibitory agent which combats the replication of said parent viral RNA, and said inhibitory agent.

References Cited

Haruna et al.: "Biochemistry," vol. 50, 1963, pp. 905–911.

Spiegelman et al.: "Biochemistry," vol. 54, 1965, pp. 919–927.

Robinson et al.: "Jour. Biological Chemistry," vol. 239, No. 9, September 1964, pp. 2944–2951.

LEWIS GOTTS, Primary Examiner

J. R. BROWN, Assistant Examiner

U.S. Cl. X.R.

195—28 N; 424—180

PO-1050
(5/69)

UNITED STATES PATENT OFFICE
CERTIFICATE OF CORRECTION

Patent No. 3,689,475          Dated September 5, 1972

Inventor(s) S. Spiegelman et al.

It is certified that error appears in the above-identified patent and that said Letters Patent are hereby corrected as shown below:

Column 1, lines 41 & 42, "ribonucieic" should be --ribonucleic--.

Column 4, line 14, "024-4)" should be --042-4)--.

Column 4, line 56, "on" should be --one--.

Column 4, line 61, "introdduce" should be --introduce--.

Column 5, line 2, "original" should be --origin--.

Column 5, line 54, "compounding" should be --confounding--.

Column 7, line 26, "encourgaed" should be --encouraged--.

Column 7, line 39, "replcase" should be --replicase--.

Column 7, line 50, "partcile" should be --particle--.

Column 7, line 60, "organims" should be --organism--.

Column 10, line 66, "7.35" should be --7.53--.

Column 15, line 65, "allosteric effects" should be scored.

Column 15, line 66, "complex" should be scored.

Column 16, line 73, "TAP" should be --ATP--.

Column 17, line 8 of Table IV, "Qβ" should be --Q β--.

UNITED STATES PATENT OFFICE
CERTIFICATE OF CORRECTION

Patent No. 3,689,475          Dated September 5, 1972

Inventor(s) S. Spiegelman et al.

It is certified that error appears in the above-identified patent and that said Letters Patent are hereby corrected as shown below:

Column 17, line 69, "a priori" should be scored.

Column 18, line 74, "complete" should be scored.

Column 20, line 33, "otherwise" should be scored.

Signed and sealed this 13th day of March 1973.

(SEAL)
Attest:

EDWARD M. FLETCHER, JR.
Attesting Officer

ROBERT GOTTSCHALK
Commissioner of Patents